United States Patent [19]
Holliday

[11] Patent Number: 5,732,747
[45] Date of Patent: Mar. 31, 1998

[54] COVE MOLDING COVER FOR ELECTRICAL CABLES

[75] Inventor: Randall A. Holliday, Westminster, Colo.

[73] Assignee: ICM Corporation, Denver, Colo.

[21] Appl. No.: 785,865

[22] Filed: Jan. 21, 1997

[51] Int. Cl.⁶ ........................ H02G 3/04
[52] U.S. Cl. ............ 138/163; 138/157; 52/220.5; 174/48
[58] Field of Search ............ 138/92, 163, 156, 138/157, 168; 174/48, 68.3, 70 C, 72 C, 101; 52/288.1, 220.5

[56] References Cited

U.S. PATENT DOCUMENTS

| | | | |
|---|---|---|---|
| 800,053 | 9/1905 | Ayres | 138/163 |
| 800,055 | 9/1905 | Ayres | 138/163 |
| 834,742 | 10/1906 | Lutz | 138/163 |
| 1,141,188 | 6/1915 | Johnson | 138/163 X |
| 1,277,550 | 9/1918 | Connell | 138/163 X |
| 1,688,134 | 10/1928 | Braunstein . | |
| 1,963,662 | 6/1934 | Knapp | 247/3 |
| 3,126,444 | 3/1964 | Taylor | 138/163 X |
| 3,707,061 | 12/1972 | Collette et al. | 52/288 |
| 4,349,220 | 9/1982 | Carroll et al. | 138/163 X |
| 4,423,284 | 12/1983 | Kaplan | 174/101 |
| 4,723,580 | 2/1988 | Trautwein | 138/163 |
| 5,212,923 | 5/1993 | Pelosi et al. | 52/288 |
| 5,274,972 | 1/1994 | Hansen | 52/220.5 |
| 5,359,817 | 11/1994 | Fulton | 52/288.1 |
| 5,406,762 | 4/1995 | Buard | 52/287.1 |
| 5,457,923 | 10/1995 | Logan et al. | 52/288.1 |
| 5,523,529 | 6/1996 | Holliday | 138/163 X |

*Primary Examiner*—Patrick F. Brinson
*Attorney, Agent, or Firm*—John E. Reilly

[57] ABSTRACT

There is provided a cove molding cover for use in routing and protecting electrical cables and cords along the inside corners of buildings. The cove molding cover assembly includes clips which are attached to one or more of the surfaces defining the corner, and a cover strip which is snapped into place upon the clips. Each of the cover strips has arcuate lips running along its margins, while the clips have circular beads extending from their sides. The beads are insertible into the lips to attach the cover strip to the clips. Because the beads are free to rotate within the arcuate lips, and because the clips and covers strip are flexible, the entire assembly can be flexed to accommodate any variations or irregularities in the angle between the surfaces defining the corner.

19 Claims, 1 Drawing Sheet

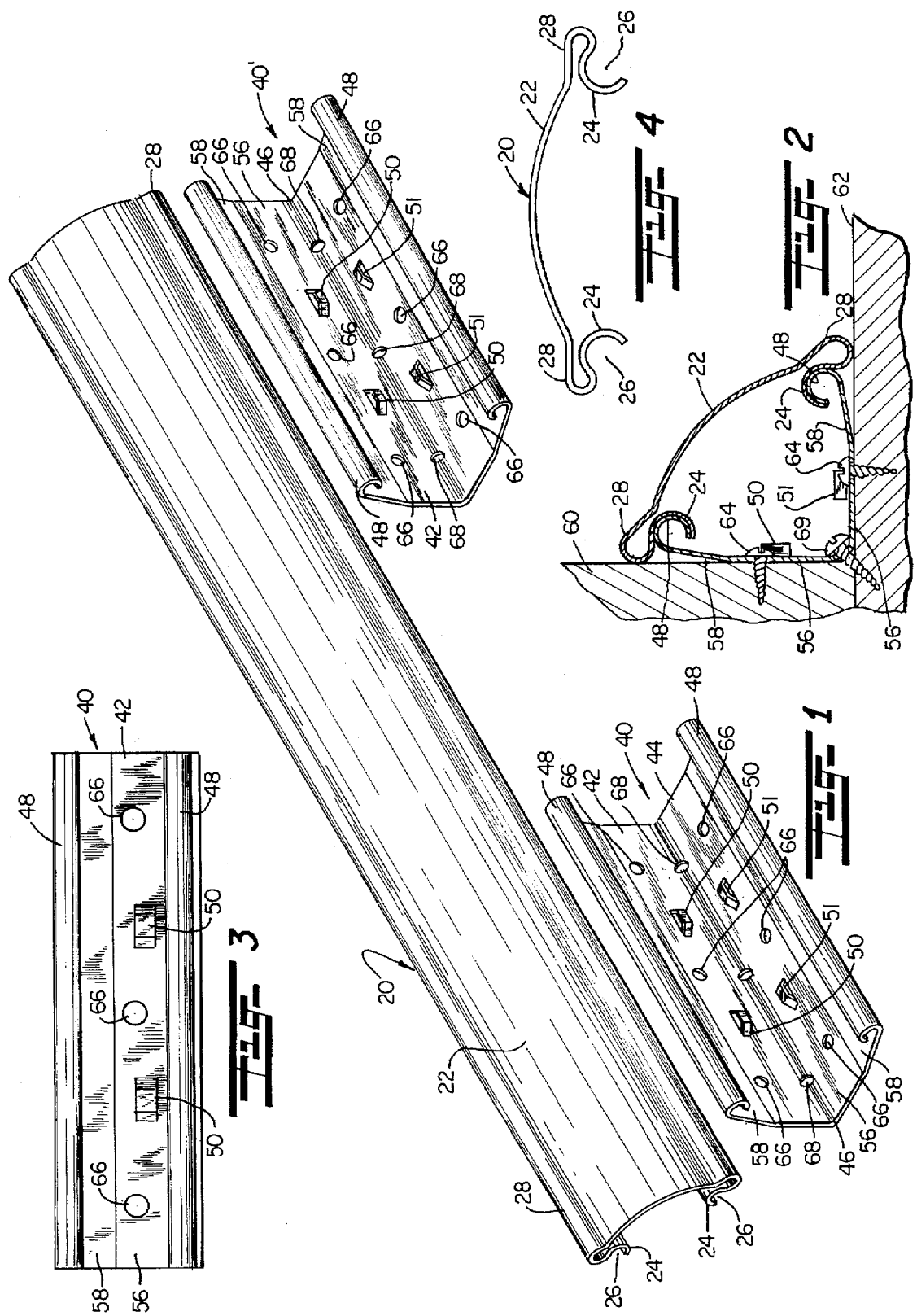

COVE MOLDING COVER FOR ELECTRICAL CABLES

BACKGROUND AND FIELD OF THE INVENTION

The invention relates to a protective covering for enclosing and routing electrical cables and the like, and more particularly to a cove molding cover assembly for running cables along and within a corner defined by two intersecting surfaces in a building, such as the corner of a floor and wall.

With increasing frequency, it is desirable to provide electrical interconnections between various apparatuses within or without a building, for example computer local area networks. The rising popularity of fax machines, cable television, electronic security systems, and other data transmission devices also fosters a need to place electrical cables in, through, and about commercial, residential, and industrial buildings. Interior cables frequently are routed at least in part above false or suspended ceilings, but not all buildings, especially older and residential structures, are provided with false ceilings above which cables may be placed. In any event, there are increasingly common situations where electrical cables must be placed in the corners of rooms, such as where two walls come together, or along a baseboard. Various efforts have been made to devise covering systems to aesthetically protect and contain such cables.

U.S. Pat. No. 1,963,662 to Knapp, for example, discloses a hollow baseboard device for carrying wires along the bottom of a wall. The Knapp device is intended for use primarily in original building construction, rather than post-construction installations.

U.S. Pat. No. 3,707,061 to Collette, et al. teaches a snap trim corner molding held in place by the insertion of a retainer rib between inwardly turned coils. The Collette et al. device evidently presumes that the surfaces defining the corner invariably define a ninety degree angle.

U.S. Pat. No. 4,423,284 to Kaplan discloses a rectangular molding duct assembly featuring hinged panels for access to contained wiring.

U.S. Pat. No. 4,723,580 to Trautwein discloses a cable sheath assembly for attachment to a single surface.

U.S. Pat. No. 5,274,972 to Hansen teaches an installation duct for utility lines. The Hansen device, as disclosed, is mostly inflexible for use in perpendicular corners between floors and walls.

Other patents of interest are U.S. Pat. No. 5,406,762 to Buard and U.S. Pat. No. 5,457,923 to Logan, et al.

Some previous efforts in this field have focused on providing elaborate devices which hold and retain wiring in tidy bundles, resulting in somewhat complicated assemblies. Many previous efforts in the field also have proceeded from the frequently questionable premise that the intersections between walls and floors, or between walls, are defined by uniformly perpendicular angles. In instances where a cover molding is designed to fit exclusively in a perpendicular corner, installation of the molding in a non-perpendicular corner is frequently complicated and nearly always unsightly due to gaps between the cove and the wall, or kinks and bends in the cove, or both. A need remains, therefore, for a simple cove molding for covering and routing cables and the like that is simple and secure, and yet which may be aesthetically installed in corners of disparate angular size.

SUMMARY OF THE INVENTION

An object of the invention is to provide a simple cove molding for covering, protecting, and routing cables and the like along building corners.

Another object of the invention is to provide a cove molding assembly which is adaptable for use in corners of differing angular size, particularly corners departing significantly from perpendicular.

An advantage of the invention is that it may be aesthetically installed in corners that have non-uniform and/or non-perpendicular angular profiles.

Another advantage of the invention is that it is easily cut to provide miter joints and tees and the like.

In accordance with the present invention, there is provided a protective apparatus for covering cables, comprising a plurality of elongated, generally V-shaped clip members and a cover strip that may be snapped into place upon the one or more clip members. Each clip member includes an edge defined at the intersection of two elongated bendable sidewalls, each sidewall extending outwardly from the edge and terminating in a substantially circular bead, and each cover strip being elongated and comprising a flexible panel having two margins, and a resiliently flexible arcuate lip extending from each of the margins, each of said lips complementary to and releasably engageable with a respective one of the beads. When the lips are engaged around respective ones of the beads, the panel is flexible and the beads are rotatable within the lips to vary a separation distance between the lips. The variability of the distance separating the lips allows the invention to be adaptable to fit into corner angles of irregular or inconsistent size.

Also in accordance with the present invention, there is provided a protective apparatus for covering cables, the apparatus adapted for installation along a corner defined by two intersecting surfaces, wherein the apparatus includes a plurality of elongated, generally V-shaped clip members, each clip member disposable in the corner and comprising an edge defined at the intersection of two elongated sidewalls, each sidewall extending outwardly from the edge, and each sidewall terminating in a substantially circular bead, and the apparatus also includes an elongated cover strip comprising along margins thereof resiliently flexible arcuate lips, each lip releasably engageable with a respective one of the beads on the clip. Means are provided for fastening each of the clip members to at least one of the surfaces. Each of the sidewalls has a base section extending from the edge which is disposable in substantially parallel contact with a corresponding one of the surfaces, and a flexible flange section, spaced apart or inclining away from the corresponding one of the surfaces, which extends from the base section to one of the beads and defines an obtuse angle with respect to the base section. The cover strip ideally comprises a curved panel that is convex with respect to the corner, while each lip preferably defines an arc of greater than 180 degrees and an inside radius corresponding substantially to the outside radius of the respective one of the beads. Accordingly, when the lips are engaged with the beads, the panel is flexible, the flange sections of the sidewalls are bendable, and the beads are rotatable within the lips to adjust the width of the cover strip to contact both the surfaces defining the corner.

Still further in accordance with the present invention, there is provided an apparatus for aesthetically securing and protecting electrical cords within and along the corner of a room defined by two surfaces, and the apparatus comprises an elongated cover strip and at lest one clip member. The elongated cover strip has a panel portion, marginal portions, and a generally arcuate lip extending from each of said marginal portions, while the clip member has a first sidewall joined to a second sidewall, with each sidewall comprising a base section intersecting the base section of the other sidewall at an angle of approximately 90 degrees, a flange section extending at an angle from the base section inwardly toward the flange section of the other side wall, and a generally circular bead upon the flange section opposite the base section and releasably insertible into one of the arcuate lips.

The above and other objects of the present invention will become more readily appreciated and understood from a consideration of the following detailed description of preferred and modified forms of the present invention when taken together with the accompanying drawings in which:

BRIEF DESCRIPTION OF THE DRAWINGS

FIG. 1 is a perspective exploded view of a preferred embodiment of the apparatus of the present invention, showing a pair of clip members and a cover strip;

FIG. 2 is a side sectional view of the preferred embodiment installed in a corner, showing the cover strip in place upon a clip member;

FIG. 3 is a front view of a clip member according to the present invention; and

FIG. 4 is a side sectional view of a cover strip according to the present invention.

DETAILED DESCRIPTION OF A PREFERRED EMBODIMENT

The drawings illustrate a preferred embodiment of the invention broadly comprising a covered raceway to contain and protect electrical cables or cords (not shown). Other types of transmission lines, such as small-diameter tubes conveying compressed air, conceivably as well may be routed and protected by the invention. Principal components of the apparatus of the invention include a cover strip 20 and at least one, preferably a plurality, of clip members 40, 40'. As indicated by FIGS. 1 and 2, the cover strip 20 snaps into position upon aligned, spaced-apart clip members 40, 40' to contain a conduit space 38 defined by the cover strip 20, a first surface 60, and a second surface 62. The protected cable or cables (not shown) are maintained within the conduit space 38. The clip members 40, 40' are in all respects identical, so that description of a single clip member 40 adequately describes the plurality.

As best indicated by FIG. 2, the invention is intended for use along and within a corner at the intersection of the first and second surfaces 60, 62. Surfaces 60 and 62 usually intersect at a substantially perpendicular angle, but an advantage of the invention is its utility in non-perpendicular corners, as further explained herein. Typically, the apparatus is installed along the lower corner of an interior room, the first surface 60 defined by a generally vertical baseboard or wall and the second surface 62 accordingly comprising a mostly horizontal floor. It is immediately appreciated, however, that the two surfaces 60, 62 may alternatively be two walls, or a wall and a ceiling, and that the invention may be adapted for exterior use. Also, while the invention is used primarily in straight corners, such corners need not be strictly vertical or horizontal. When it is necessary to change the direction of the cable route, for example to go around a corner, a pair of cover strips 20 may be miter cut for mutual abutment, and clip members 40, 40' installed on opposite sides of the intervening edge or corner, permitting aesthetic installation of the apparatus around edges and the like. The invention thus is utilized to route cables through a structure as desired.

Both the cover strip 20 and the clip members 40, 40' may be manufactured from rolled metal strips, extruded plastic, or other relatively stiff yet resiliently bendable material. For example, the components optionally comprise sheet metal available under the trademark GALVALUME, a combination of galvanized sheet metal and aluminum. Either the cover strip 20 or the clip member 40, or preferably both, is elastically flexible and fracture-resistant, capable of bending when loaded, but with memory to "snap" back to the original configuration when unloaded.

FIGS. 1 and 2 illustrate that the clip members 40, 40' are comparatively short with respect to the cover 20, so that two or more clip members 40, 40' typically are used to anchor a cover strip 20 longitudinally along the corner defined by surfaces 60, 62. Each clip member 40 or 40' comprises two elongated sidewalls 42, 44 which are joined longitudinally to define a common edge 46 at their intersection. The sidewalls 42, 44 extend outwardly from the edge 46 to define a generally V-shaped cross section, as best indicated by FIG. 2. The standard angle included between the sidewalls 42, 44 preferably is about 90 degrees, although the flexibility of the clip member 40 permits the sidewalls to be bent inwardly or outwardly about the edge 46 to define angles lesser or greater than 90 degrees.

Each sidewall 42, 44 terminates, at its outside end, in a substantially circular bead 48. FIGS. 1 and 2 illustrate that each clip member 40 may be manufactured from an initially flat strip of metal or plastic, the sidewalls 42, 44 and beads 48 defined by bends and curls in the integral strip. Notably, the bead 48 economically and efficiently may constitute a curled extension of a sidewall 42 or 44; the curl may either be outward toward a surface 60 or 62, or inward as shown in FIG. 2, i.e., directed within the V-shape of the clip member 40 and toward one another.

In the preferred embodiment, each sidewall 42, 44 is not absolutely planar, but is bent at a mild angle to define a flange section 58 extending from a base section 56 of each respective sidewall. The free or terminal end of the flange section 58 terminates with the bead 48. Each flange section 58 is bent slightly inward, generally toward the opposite sidewall, such that the angle included by the base section 56 and the flange section is extremely obtuse, in the range of from about 170 degrees to about 179 degrees. Accordingly, when the base section 56 is secured to a surface 60 or 62 as shown in FIG. 2, an acute angular space remains between the flange section 58 and the corresponding surface 60 or 62. The resulting angled relation of the flange section 58 with respect to the corresponding surface 60 permits the flange section to move flexibly with respect to the surface 60, in turn permitting the bead 48 to be positioned closer or further from the surface as shall be further explained.

Combined reference is made to FIGS. 1–3, which illustrate that each clip member 40 is completely penetrated by fastener apertures 66 whereby fasteners 64 such as screws, brads or the like may be disposed through one or both sidewalls 42, 44 of the clip member 40 to attach the clip to one or both the surfaces 60 and 62. Preferably, each sidewall 42, 44 features at least two apertures 66 so that the clip member 40 may be securely fixed within the corner using fasteners 64 disposed through only one sidewall 42 if desired, for example in instances where the floor 62 is solid concrete. In the preferred embodiment, sidewall apertures 66 are disposed through the base section 56 of each sidewall 42 or 44, so that when the clip member 40 is installed in the corner, each flange section 58 remains flexibly movable with respect to the surfaces 60, 62. Additionally, one or more corner apertures 68 pierce each clip member 40 at or about the edge 46, allowing the clip to be fastened to the corner with a corner fastener 69 as depicted in FIG. 2.

Referring to FIGS. 1 and 3, the sidewalls 42, 44 also feature wire ties 50, 51 in associated pairs stamped from the sidewall material and projecting inwardly from the sidewall inside surfaces. As shown, the ties 50, 51 preferably are closed loops, but alternatively may be prongs. Ties 50, 51 are used, in conjunction with short segments of wire (not shown), to secure the cable or cables within the conduit space 38.

Attention is invited to FIG. 4, illustrating a cross section of cover strip 20. The bilaterally symmetrical cover strip 20 comprises a panel portion 22 extending between longitudinal margins, and a specially flared return or lip 24 extending from each margin. In the preferred embodiment, the panel portion 22 includes a gently curved convex central portion and two narrow, flat flanges 28, with the lip 24 bendably extending from and below each flange 28. Lip 24 preferably runs the length of the cover strip 20. A recurvate extension of the flange connects the lip 24 to the panel 22, so that the lip is closely spaced generally parallel to, and immediately below, the flange 28 as shown in FIG. 4. The central portion of the panel 22 alternatively may be concave, curving in the opposite direction from that shown in FIG. 4, and optionally may be finished with a decorative pattern, color, texture, or simulated wood veneer, or the like, to provide for aesthetic installation within a home or office. The curvature of the panel 22, whether concave or convex with respect to the corner, allows the panel 22 to bend about its axis to adjust the distance between the marginal lips 24.

In the preferred embodiment, each lip 24 is an integral, curled extension of the cover strip 20. The lip 24 comprises an arc, partially enclosing and defining a generally semicylindrical concavity 26 running the length of the cover 20. The concavities 26 of the respective lips 24 preferably face outwardly away from each other as shown in FIG. 4, but alternative functional embodiments of the cover strip 20 may feature a reversed direction of curl, so that the concavities 26 are in mutually confronting relation. In the preferred embodiment, the arc of the lip 24 extends through more than 180 degrees, so that the cross section of the lip 24 is slightly greater than a true semicircle. The arc of the lip 24 nevertheless is less than about 195 degrees, and defines a gap between the ends of the arc that is slightly less than the diameter of the bead 48. Thus, due to the resilient flexibility of the lip 24, the bead 48 is insertible through the gap and into the concavity 26 as shown in FIG. 2.

The practice of the invention is illustrated with combined reference to FIGS. 1 and 2. A pair or more clip members 40, 40' are secured to either or both surfaces 60, 62 of a corner, the clips being in a co-aligned spaced-apart relation to one another, by inserting fasteners 64 through sidewall apertures 66 into either or both of the surfaces. Alternatively, corner fasteners 69 may be driven through one or more corner apertures 68 as desired, for instance to conserve fasteners or avoid creating permanent holes in the more visible portions of the surfaces 60, 62. Preferably, clip members 40, 40' are spaced apart to provide a clip at each end of a particular cover strip 20, although it is readily appreciated that additional clips may be intermediately located along lengthy cover strips. Also, a single clip member 40 may overlap axially adjacent cover strips, to engage the respective abutting ends thereof, in a manner whereby three clips can be used, for example, to attach two cover strips into a corner.

Cover strip 20 is "snapped" into connection with clip members 40, 40' by inserting the respective bead 48 on each sidewall 42, 44, into the concavity defined by the arcuate lip 24 on each margin of the cover strip 20. The bendable resiliency of the lip 24 permits the snapped insertion of the bead 48 therein. As shown in FIG. 2, the outside radius of curvature of each bead 48 is approximately equal to the inside radius of curvature of a corresponding arcuate lip 24 to provide a snug, concentric, engagement of the bead within the lip. Notably, in the installed position, the lip 24 wraps somewhat more than halfway around the circumference of the bead 48 to provide a positive interconnection even if and when the bead rotates coaxially with respect to the lip. The flexible resiliency of the cover strip 20 and the flange section 48 tend to maintain the lip 24 and bead 48 in mutual contact in the event either the cover 20 or the clip member 40 is deformed from its rest position.

The concentric engagement of the bead 48 within the lip 24, especially in cooperation with the flexible angular position of the flange section 58 with respect to the base section 56 of each sidewall 42, 44, promotes an advantage of the invention. Flange section 58 can be flexed either closer to, or further from, its nearby surface 60 or 62. Similarly, the panel 22 of the cover strip 20 can be flexed to move the lips 24 closer or further apart. Because the panel portion 22 and lips 24 of the cover strip, and the flange sections 48 of the clip, are all elastically flexible, the straight-line distances between the two beads 48 on each clip, and between the two lips 24 on each cover, are adjustable. Accordingly, the clip member 40 and the cover strip 20 can be bent to conform both to each other and to the angle included between the surfaces 60, 62—particularly when that angle is irregular, varies along the length of the cover strip, or departs significantly from ninety degrees. Consequently, the invention is highly adaptable to the particular conditions along and within a given corner, permitting a more positive and cosmetic installation.

By way of example, a decorative baseboard is substantially thicker at its base than at its top, with the result that surface 60 is not perpendicular to the floor 62 but instead defines an obtuse angle of, for instance, 99 degrees. A clip member 40 is installed in the corner by driving screws 64 through one or both base sections 56 into the adjacent surface 60 or 62. Base sections 56 are bent outwardly to draw them securely substantially flush against respective surfaces 60, 62. The bending of the base sections 56 increases their included angle, with the result that the distance separating the beads 48 also is increased.

The cover strip 20 is installed upon the clip member 40 by flexing the panel portion 22 as needed to adjust the distance separating the lips 24 to correspond substantially to the distance between the beads 48. The flexed cover strip 20 is press-fit into engagement with the clip member 40 by inserting each bead 48 within a respective lip 24. Concurrently, the flange sections 58 may flex outward, their elasticity tending to pull the beads 48 toward each other to hold the cover strip 20 in place.

Notably, bead 48 may be snugly inserted into lip 24 generally without regard for the precise radial position of the bead 48 with respect to the lip, since both define nearly equal radii. As an advantageous result, the snap fit of the bead 48 into an associated lip 24 is largely independent of the distance between beads 48 in a particular instance; the cover strip 20 may be flexed to adjust the distance between lips 24 to correspond to the separation between beads 48, and the beads inserted into the lips 24, without adversely impacting the ease or reliability of the connection between the cover strip 20 and the clip member 40. Similarly, the radial position of the lip 24 may differ with regard for the beads 48 of separate clip members 40 and 40, engaged with a single cover 20, permitting the invention to accommodate slight undulations or warps along the length of either of the surfaces 60, 62.

FIG. 2 shows that when the cover 20 is in position upon the clip member 40, the recurvate portions of the flanges 28 of the cover 20 extend laterally beyond the lips 24, closely approaching or actually contacting the surfaces 60, 62. Consequently, the cover strip 20 aesthetically covers completely the clip member 40, and the lips 24 are concealed beneath the cover strip, when the cover strip is snapped in place upon the clip member 40. Notably, the panel portion 22 is flexible to increase or flatten its curve to adjust the effective width of the cover strip 20, that is, to decrease or increase the linear distance between the margins of the cover strip. Additionally, the flange sections 58 of the sidewalls are flexible inwardly or outwardly, so that, when the cover strip is in place upon the clip member 40, the flanges 28 of the cover strip may contact the surfaces 60, 62 despite variations in the size of the angle defined by the baseboard 60 and floor 62. If desired, both the cover strip 20 and the clip member 40 may be bent past their respective mechanical yield points to plastically deform their shapes to permanently adapt to the particular corner in which they are installed, e.g., an undulating baseboard with a tilted facade. This adaptability is fostered by the universal rotatable link provided by the concentric, slidable disposition of the circular bead 48 within the arcuate lip 24.

The cove molding of the invention may be installed into variable, non-perpendicular, or otherwise atypical corners and yet provide a cosmetic and attractive cover. The components of the cover strip 20 and clip member 40 can be bent into a position whereby the margins of the cover are substantially always in contact with both surfaces 60, 62, thus eliminating unsightly gaps and cracks. The convex or concave shape of the panel 22 of the cover strip 20 permits it to be flexed to conform to installation needs without kinking or buckling.

It is therefore to be understood that while a preferred form of cove molding cover for electrical cables has been herein set forth and described, various modification and changes may be made in the construction and arrangement of parts as well as composition of materials without departing from the spirit and scope of the present invention as defined by the appended claims.

I claim:

1. A protective apparatus for covering cables, comprising:
    at least one elongated clip member, said clip member comprising an edge defined at the intersection of two elongated sidewalls, each said sidewall extending away from said edge and terminating in a substantially circular bead; and an elongated cover strip comprising:
    a flexible panel having two margins; and
    an arcuate lip extending from each of said margins, each of said lips releasably engageable with a respective one of said beads, wherein each said lip comprises an arc of greater than 180° and an inside radius corresponding substantially to an outside radius of a respective one of said beads, and wherein when said lips are engaged with respective ones of said beads, said panel is flexible and said beads are rotatable within said lips to vary a separation distance between said lips.

2. Apparatus according to claim 1, wherein each of said sidewalls comprises:
    a base section extending from said edge; and
    a flexible flange section extending from said base section to one of said beads and defining an obtuse angle with respect to said base section.

3. Apparatus according to claim 2 wherein each of said flange sections is bendable with respect to the base section from which it extends to define a variable angle between each said flange section and its corresponding base section.

4. A protective apparatus for covering cables, said apparatus adapted for installation along a corner defined by two intersecting surfaces and comprising:
    a plurality of elongated clip members, each said clip member disposable in the corner and comprising an edge defined at the intersection of two elongated sidewalls, each said sidewall bent inwardly toward one another so as to define an angle slightly less than 90° at their free ends, and each said sidewall terminating in a substantially circular bead;
    an elongated cover strip including resilient flexible arcuate lips along margins thereof, each said lip releasably engageable with a respective one of said beads; and
    means for fastening each said clip member to at least one of said surfaces.

5. Apparatus according to claim 4, wherein each of said sidewalls comprises:
    a base section extending from said edge and disposable in substantially flush contact with a corresponding one of the surfaces; and
    a flexible flange section, spaced apart from the corresponding one of the surfaces, extending from said base section to one of said beads and defining an obtuse angle with respect to said base section.

6. Apparatus according to claim 5, wherein said means for fastening comprises at least one aperture in at least one of said base sections, through which at least one base section is fastenable to the corresponding one of the surfaces.

7. Apparatus according to claim 5, wherein said means for fastening comprises at least one aperture through said edge.

8. Apparatus according to claim 5, wherein said cover strip comprises a curved panel.

9. Apparatus according to claim 8 wherein said curved panel is convex with respect to the corner.

10. Apparatus according to claim 8, wherein each said lip comprises an arc of greater than 180 degrees and an inside radius corresponding substantially to an outside radius of a respective one of said beads.

11. Apparatus according to claim 10, wherein said cover strip further comprises flanges having recurvate portions connecting said curved panel to each of said lips, whereby each of said lips is held in closely spaced apart relation to one of said flanges and between said one flange and the corresponding surface when said lip is engaged with the respective one of said beads.

12. Apparatus according to claim 11 wherein when said lips are engaged with respective ones of said beads, said panel is flexible, said flange sections are bendable, and said beads are rotatable within said lips whereby to adjust the width of said cover strip to contact both the surfaces.

13. Apparatus for aesthetically securing and protecting electrical cords within and along the corner of a room defined by two surfaces, said apparatus comprising:
    an elongated cover strip comprising a panel portion, recurvate marginal portions, and a generally arcuate lip extending inwardly beneath said panel portion from each of said marginal portions;
    at least one clip member comprising a first sidewall joined to a second sidewall, each of said first and second sidewalls comprising:
    a base section intersecting the base section of another of said sidewalls at an angle of approximately 90°;

a flange section extending at an angle from said base section inwardly toward the flange section of said other side wall; and a generally circular bead upon said flange section opposite said base section and releasably insertable into one of said arcuate lips with said marginal portions contacting said surface.

14. Apparatus according to claim 13, further comprising means for fastening said clip member to at least one of the two surfaces, said means for fastening comprising at least one aperture through at least one of said base sections.

15. Apparatus according to claim 13, wherein said panel is curved.

16. Apparatus according to claim 15 wherein said panel is curved convex outward from the corner when said beads are inserted into said lips.

17. Apparatus according to claim 13, wherein each of said lips comprises an arc of greater than 180 degrees.

18. Apparatus according to claim 17, wherein each of said lips defines an inside radius corresponding substantially to an outside radius of a respective one of said beads.

19. Apparatus according to claim 15, wherein said bead is rotatable within said arcuate lip whereby to adjust the width of said cover strip to cause said marginal portions to contact said surfaces.

* * * * *